( 12 ) United States Patent
Pasad

(10) Patent No.: US 11,425,732 B1
(45) Date of Patent: Aug. 23, 2022

(54) WIRELESS LINK CONTROL USING CONTEXTUAL BANDIT

(71) Applicant: Marvell Asia Pte Ltd, Singapore (SG)

(72) Inventor: Kalpendu Pasad, Cupertino, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 31 days.

(21) Appl. No.: 17/172,121

(22) Filed: Feb. 10, 2021

Related U.S. Application Data

(60) Provisional application No. 62/975,086, filed on Feb. 11, 2020.

(51) Int. Cl.
H04L 27/22 (2006.01)
H04W 72/08 (2009.01)
H04B 7/0452 (2017.01)

(52) U.S. Cl.
CPC ........ *H04W 72/085* (2013.01); *H04B 7/0452* (2013.01)

(58) Field of Classification Search
CPC ..... H04L 27/22; H04L 1/0001; H04B 7/4017; H04B 7/0456; H04B 7/0626; H04W 16/28
USPC ....................................................... 375/329
See application file for complete search history.

(56) References Cited

U.S. PATENT DOCUMENTS

| 8,644,765 B1 * | 2/2014 | Zhang | H04B 7/0456 455/60 |
| 2021/0044399 A1 * | 2/2021 | Wang | H04L 5/0048 |
| 2021/0176018 A1 * | 6/2021 | Bai | H04L 1/1893 |

OTHER PUBLICATIONS

Klear, "How to Make Data-Driven Decisions with Contextual Bandits—The Case for Bayesian Inference," pp. 1-11, Oct. 12, 2018.
Nikolov et al., "A Contextual Bandit Approach to the Interface Selection Problem," Proceedings of the 24th IEEE International Conference on Emerging Technologies and Factory Automation (ETFA 2019), Zaragoza, Spain, pp. 1707-1714, year 2019.
3GPP Technical Specification TS 36.211, "3rd Genertion Partnership Project; Technical Specification Group Radio Access Network; Evolved Universal Terrestrial Radio Access (E-UTRA); Physical Channels and Modulation (Release 14)", version 14.15.0, Section 6.4, pp. 1-12, Jun. 2020.

* cited by examiner

*Primary Examiner* — Khai Tran

(57) ABSTRACT

A method for communication includes obtaining channel estimates that approximate a response of a communication channel between a transmitter and one or more receivers, and performing an iterative process for improving one or more predefined quality metrics of communication between the transmitter and the one or more receivers. The iterative process includes mapping at least the channel estimates into a transmission scheme of the transmitter using a mapping policy, causing the transmitter to apply the transmission scheme, obtaining, based on signals transmitted from the transmitter to the one or more receivers using the transmission scheme, values of the one or more predefined quality metrics, and modifying the mapping policy to improve the quality metrics.

16 Claims, 4 Drawing Sheets

WIRELESS LINK CONTROL USING CONTEXTUAL BANDIT

CROSS-REFERENCE TO RELATED APPLICATIONS

This application claims the benefit of U.S. Provisional Patent Application 62/975,086, filed Feb. 11, 2020, whose disclosure is incorporated herein by reference.

FIELD OF THE DISCLOSURE

The present disclosure relates generally to communication systems, and particularly to methods and systems for transmission scheme adaptation based on quality metrics.

BACKGROUND

Various communication systems use various kinds of adaptive algorithms for configuring signal transmission based on received signal quality. Such algorithms include, for example, power control, adaptive modulation and coding, adaptive beamforming, adaptive scheduling and the like.

The description above is presented as a general overview of related art in this field and should not be construed as an admission that any of the information it contains constitutes prior art against the present patent application.

SUMMARY

An embodiment that is described herein provides a method for communication including obtaining channel estimates that approximate a response of a communication channel between a transmitter and one or more receivers, and performing an iterative process for improving one or more predefined quality metrics of communication between the transmitter and the one or more receivers. The iterative process includes mapping at least the channel estimates into a transmission scheme of the transmitter using a mapping policy, causing the transmitter to apply the transmission scheme, obtaining, based on signals transmitted from the transmitter to the one or more receivers using the transmission scheme, values of the one or more predefined quality metrics, and modifying the mapping policy to improve the quality metrics.

In some embodiments, obtaining the quality metrics includes obtaining an estimate indicative of a successful data throughput between the transmitter and the one or more receivers.

In some embodiments, the one or more receivers comprise multiple receivers, the communication channel comprises a Multi-User Multiple-Input Multiple-Output (MU-MIMO) channel between the transmitter and the multiple receivers, and mapping at least the channel estimates into the transmission scheme includes selecting groups of the receivers to be grouped together for MU-MIMO communication. In an example embodiment, mapping at least the channel estimates into the transmission scheme includes selecting the groups of the receivers based on both (i) the channel estimates and (ii) respective attributes of one or more of the receivers.

In some embodiments, mapping at least the channel estimates into the transmission scheme includes selecting for the transmitter one or more of (i) a transmission rank, (ii) a precoding scheme and (iii) a modulation and coding scheme. In example embodiments, mapping at least the channel estimates into the transmission scheme includes selecting the transmission scheme based on the channel estimates and one or more of: a metric indicative of a coherence time of the communication channel, a metric indicative of a scheduling latency between a receiver and the transmitter, and a metric indicative of a signal-to-noise ratio measured at a receiver.

In a disclosed embodiment, modifying the mapping policy includes running a Contextual Bandit (CB) process that aims to map at least the channel estimates into the transmission scheme by a mapping that maximizes the one or more predefined quality metrics. In an embodiment, performing the iterative process includes improving the predefined quality metrics in a given iteration of the iterative process, based on the signals transmitted from the transmitter to the one or more receivers in a previous iteration of the iterative process.

There is additionally provided, in accordance with an embodiment that is described herein, a communication device including a transceiver and a processor. The transceiver is configured to communicate with one or more peer communication devices over a communication channel. The processor is configured to obtain channel estimates that approximate a response of the communication channel, and to perform an iterative process for improving one or more predefined quality metrics of communication between the communication device and the one or more peer communication devices. The iterative process includes mapping, using a mapping policy, at least the channel estimates into a transmission scheme of a transmitter of the communication device or of a peer communication device, causing the transmitter to apply the transmission scheme, obtaining, based on signals transmitted from the transmitter to the one or more peer communication devices using the transmission scheme, values of the one or more predefined quality metrics, and modifying the mapping policy to improve the quality metrics.

The present disclosure will be more fully understood from the following detailed description of the embodiments thereof, taken together with the drawings in which:

DETAILED DESCRIPTION OF EMBODIMENTS

Figure 1:
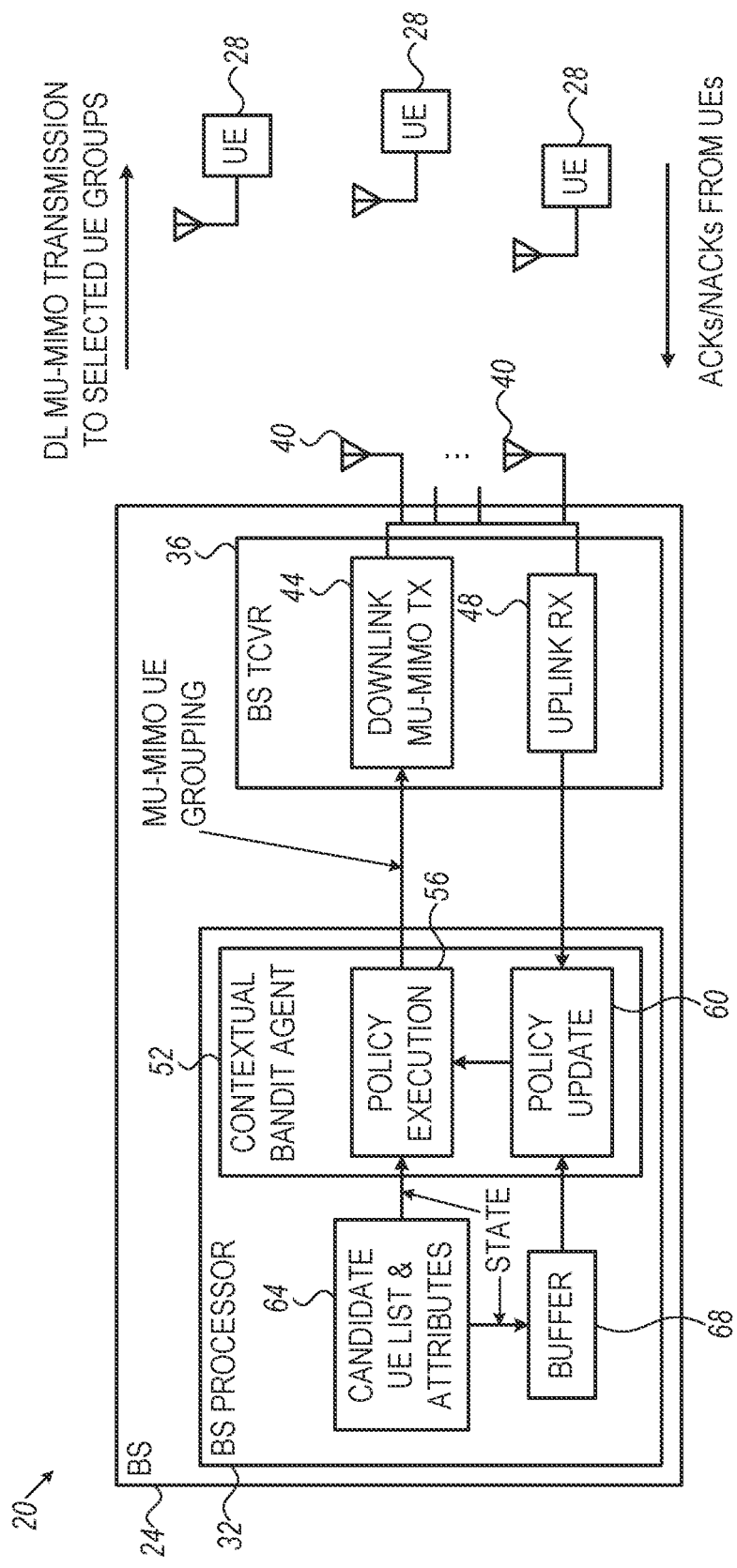
FIG. 1 is a block diagram that schematically illustrates a Multi-User Multiple-Input Multiple-Output (MU-MIMO) communication system that performs user grouping using a Contextual Bandit (CB), in accordance with an embodiment that is described herein.

Embodiments that are described herein provide improved methods and systems for setting a transmission scheme of a transmitter based on channel estimates and optionally additional relevant metrics. The transmitter may be, for example, a downlink transmitter of a Base Station (BS) or an uplink transmitter of a User Equipment (UE) in a cellular communication system.

The disclosed techniques are demonstrated below in the context of two non-limiting examples, one relating to user grouping in a Multi-User Multiple-Input Multiple-Output (MU-MIMO) BS, and the other relating to channel feedback estimation in a UE. Generally, however, the disclosed techniques are applicable in various other systems and applications.

Put broadly, in some embodiments a transmitter transmits signals to one or more receivers over a communication channel. A processor, in the transmitter or in a receiver, obtains channel estimates that approximate the response of the communication channel. The processor then carries out an iterative process for improving one or more predefined quality metrics of the communication between the transmitter and the receiver or receivers. In an example embodiment, the iterative process aims to maximize the data throughput between the transmitter and the receiver or receivers.

The iterative process uses a "mapping policy", which maps the channel estimates (and additional relevant metrics, if used) into parameters that define the transmission scheme of the transmitter. In the MU-MIMO use-case, for example, the mapping policy translates the channel estimates into a definition of groups of users to be grouped together in a subsequent MU-MIMO transmission. In the channel feedback use-case, the mapping policy maps the channel estimates to a selection of channel-feedback values such as Rank Indicator (RI), Precoding Matrix Indicator (PMI) and/or Modulation and Coding Scheme (MCS).

In a given iteration of the iterative process, the processor translates the channel estimates (and additional relevant metrics, if used) into a transmission scheme of the transmitter using the mapping policy. The transmitter then applies the transmission scheme, and transmits signals to the receiver or receivers accordingly. Based on the signals received at the receiver or receivers, the receiver or receivers evaluate and send quality metrics back to the transmitter. The processor obtains current values of the predefined quality metrics (e.g., the currently achieved data throughput) and modifies the mapping policy to improve the quality metrics.

The processor may repeat such iterations on an on-going basis, or until reaching some desired communication performance. As seen, in the present context each iteration of the disclosed iterative process involves a transmit-receive iteration between the transmitter and the receiver, as opposed to a mere computation iteration in the processor.

In some embodiments, the processor determines the transmission scheme by carrying out a Contextual Bandit (CB) process that iteratively optimizes a mapping between the channel estimates (and the additional relevant metrics, if used) and the transmission scheme that is sought. When using a CB process, the task to be performed is formulated in terms of a state space, an action space and rewards. The mapping policy maps the state space onto the action space. The CB process adaptively modifies the mapping policy so as to maximize the rewards. For the task of optimizing a transmitter's transmission scheme, the state space comprises the channel estimates plus optional additional metrics, the action space comprises the parameters of the transmission scheme, and the rewards comprise the predefined quality metrics of communication between the transmitter and the receiver or receivers.

In the MU-MIMO use-case, for example, the state space may comprise the channel estimates and additional metrics such as Channel State Information (CSI), a fill status of a transmit buffer of the transmitter, Quality-of-Service (QoS) requirements for the various users, fair scheduling requirements to be applied among the users, latency information, mobility information, and the like, as well as receiver characteristics. The action space comprises a definition of groups of users to be grouped together in a subsequent MU-MIMO transmission. The rewards may comprise the total data rate of the successfully received packets. This total data rate may be determined, for example, from counts of positive acknowledgements (ACKs) and/or negative acknowledgements (NACKs) that are sent from the receivers upon successful or failed reception of packets. The CB process thus learns to find the grouping of users that results in a MU-MIMO transmission that maximizes the successful data rate, given the channel estimates and additional metrics.

In the channel feedback use-case, the state space may comprise the channel estimates and additional metrics such as Doppler information (or other information indicative of the coherence time of the communication channel), scheduling latency information, post-equalization Signal-to-Noise Ratio (SNR), and the like. The action space comprises, in some embodiments, combinations of {RI, PMI, MCS} values. The rewards comprise, in some embodiments, counts of successfully decoded code blocks, extrinsic information transfer ("EXIT") information from the decoder, and/or post-equalization SNR. In an embodiment, the CB process attempts to find the combination of RI, PMI and MCS that maximizes the rewards, given the channel estimates and additional metrics.

As already noted, the two use-cases given above are in no way limiting. The disclosed techniques are applicable in various other use-cases and applications. The disclosed techniques not limited to any specific implementation of Contextual Bandit processes. Non-limiting examples of Contextual Bandit schemes can be found in an article by Klear, entitled "How to Make Data-Driven Decisions with Contextual Bandits—The Case for Bayesian Inference," Towards Data Science, Oct. 12, 2018. Moreover, the disclosed techniques are in no way limited to Contextual Bandit processes, and may be carried out using any other suitable iterative optimization processes.

FIG. 1 is a block diagram that schematically illustrates a Multi-User Multiple-Input Multiple-Output (MU-MIMO) communication system 20 that performs user grouping using a Contextual Bandit (CB) process, in accordance with an embodiment that is described herein. System 20 comprises a Base Station (BS) 24 and multiple User Equipment (UEs) 28. BS 24 transmits downlink (DL) MU-MIMO signals to UEs 28 over a wireless communication channel, and receives uplink (UL) signals from UEs 28 over the wireless communication channel. The terms "UE" and "user" are used interchangeably herein.

In an example embodiment, BS 24 and UEs 28 operate in accordance with Fifth-Generation (5G) cellular standards of the Third-Generation Partnership Project (3GPP). In alternative embodiments, however, system 20 may operate in accordance with any other suitable communication standard or protocol that supports MU-MIMO transmissions, such as, for example, in Wi-Fi.

In the present example, BS 24 comprises a BS processor 32, a BS transceiver (TCVR) 36, and a plurality of antennas 40. BS processor 32 is configured to carry out the various processing tasks of the BS. BS transceiver 36 comprises a downlink transmitter (TX) 44 configured to transmit downlink MU-MIMO signals to UEs 28 via antennas 40, and an uplink receiver (RX) 48 configured to receive uplink signals from UEs 28 via antennas 40.

In some embodiments, among other tasks, BS processor 32 divides UEs 28 into groups, and transmits downlink signals jointly to the UEs in each group, separately from the other groups. The term "UE group" refers to two or more UEs 28 to which BS 24 transmits jointly. The time/frequency resource used for joint transmission to a certain UE group is referred to as a "MU-MIMO opportunity". The task of dividing UEs 28 into groups is referred to as "UE grouping".

Various criteria can be used for choosing which UEs 28 to group together and which UEs 28 to allocate to different groups. The grouping has a considerable impact on system performance, e.g., on the total downlink throughput. In some embodiments, BS processor 32 performs UE grouping using a Contextual Bandit (CB) agent 52, which carries out an iterative CB process. The output of CB agent 52 comprises a selected UE grouping that is provided to downlink transmitter 44. Transmitter 44 uses the UE grouping in scheduling a subsequent downlink transmission.

In the embodiment of FIG. 1, BS processor 32 holds a list 64 of UEs 28 that are candidates for grouping. List 64 also holds respective attributes of UEs 28, e.g., location, mobility (e.g., velocity), receiver characteristics, QoS requirements, channel characteristics (e.g., channel estimates and/or CSI), and/or any other suitable attribute that is relevant to grouping. The list of UEs and their attributes is also referred to as a "state". Since some of the UE attributes, e.g., location and mobility, may vary over time, the state is also considered to be time variable. BS processor 32 stores the current state in a memory buffer 68.

As explained above, the CB process typically uses a "mapping policy" (also referred to herein as "policy" for brevity), which maps channel estimates and additional relevant metrics (e.g., the attributes stored in 64) to a selected UE grouping. In CB terminology, the policy maps a state space onto an action space, and adaptively modifies the policy so as to maximize certain rewards. In an embodiment, the state space, action space and rewards comprise the following:

State space: Baseband channel estimates that approximate the response of the downlink MIMO channel between BS antennas 40 and UEs 28. The channel estimates may pertain to the entire bandwidth of downlink receiver 124, or to a partial bandwidth. In an embodiment, the channel estimates may be of lower dimensionality than the full dimensionality of the MIMO channel (wherein dimensionality is defined as the number of transmitter antennas multiplied by the number of receiver antennas). Lower dimensionality channel estimates can be produced, for example, by projection using the channel eigenvectors, or using an auto-encoder, for example. A suitable combination of CSI parameters may comprise, for example, a fill status of a transmit buffer of the transmitter (e.g., in terms of Buffer Status Report—BSR), QoS requirements for the various UEs, fair scheduling requirements to be applied among the UEs, latency information for the various UEs, mobility information of the various UEs, receiver characteristics of the various UEs. The above variables are referred to as "state-space variables".

Action space: A selected grouping of the candidate UEs into groups.

Rewards: A total data rate (throughput) of downlink transmissions (e.g., packets) that are successfully received by the UEs. This total data rate may be determined, for example, by BS processor 32 by counting positive acknowledgements (ACKs) and/or negative acknowledgements (NACKs) that are sent from UEs 28 upon successful or failed reception of downlink transmissions (e.g., packets).

Additionally or alternatively, any other suitable parameters can be used for the state space, action space and rewards.

In an embodiment, CB agent 52 comprises a policy update module 60, which updates the policy based on updated state-space variables, and a policy execution module 56, which executes the updated policy so as to generate an updated UE grouping. The CB process can be viewed as having two stages that are repeated iteratively (as detailed in FIG. 2 below):

Policy execution: In this stage, policy execution module 56 applies the current policy, i.e., generates a UE grouping based on the current state-space variables.

Policy update: In this stage, policy update module 60 calculates the current rewards (e.g., the current downlink throughput), and updates the policy based on updated state-space variables so as to maximize the rewards.

In various embodiments, any suitable CB technique can be used for implementing CB agent 52 and its components. Example CB techniques can be found in the Klear article, cited above.

Figure 2:
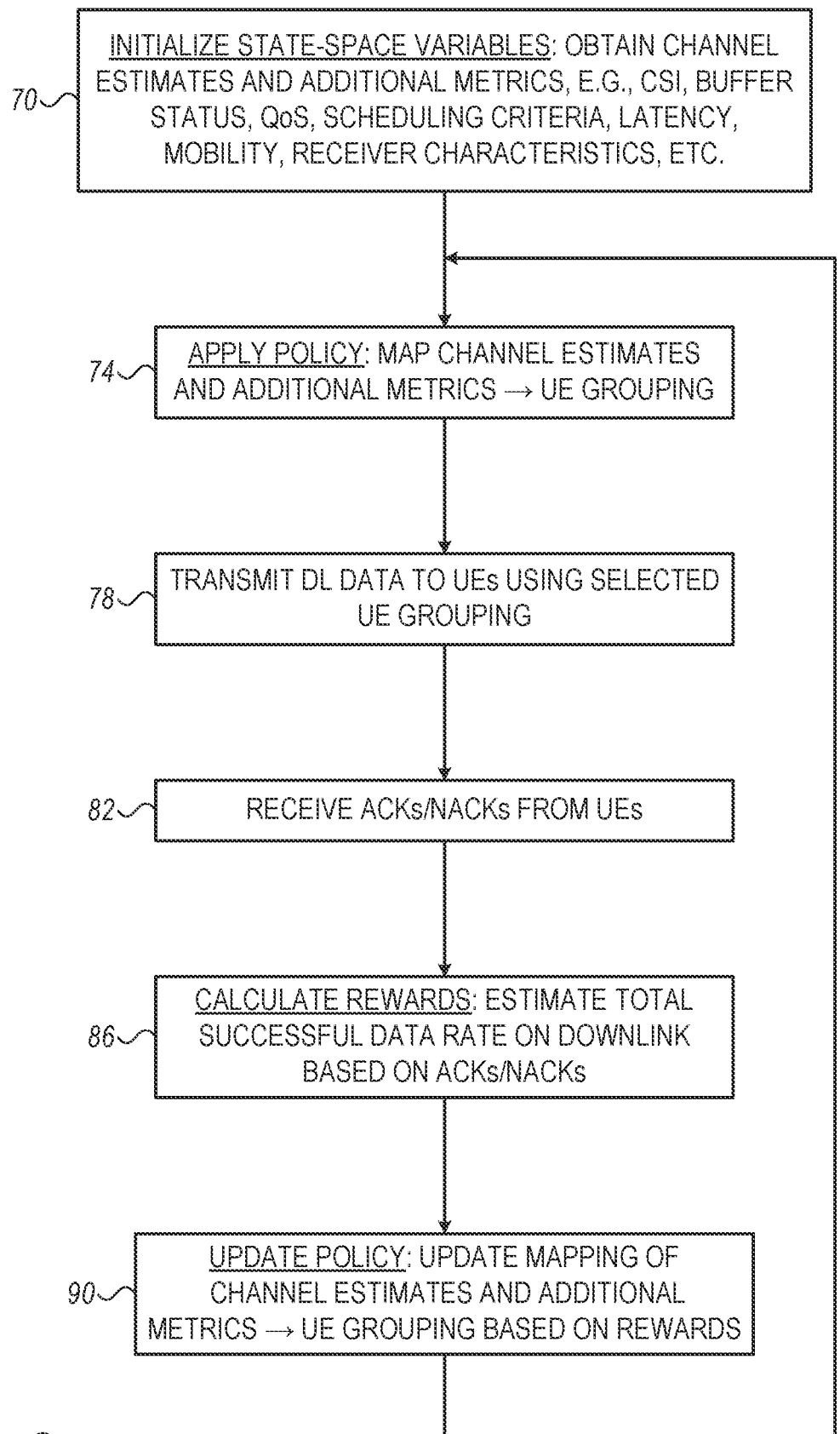
FIG. 2 is a flow chart that schematically illustrates a method for user grouping in the MU-MIMO communication system of FIG. 1, in accordance with an embodiment that is described herein.

FIG. 2 is a flow chart that schematically illustrates a method for user grouping in MU-MIMO communication system 20 of FIG. 1, in accordance with an embodiment that is described herein. The method begins with BS processor 32 of BS 24 initializing the state-space variables, at a state space initialization operation 70. In an embodiment, BS processor 32 obtains initial values of the channel estimates and the additional metrics described above, e.g., the state information stored in buffer 68. Channel estimates may be obtained, for example, from UEs 28 over the uplink channel, or estimated by BS processor 32 assuming reciprocity between the uplink and downlink channel responses.

At a policy application operation 74, policy execution module 56 in CB agent 52 executes the current policy. In an embodiment, policy execution module 56 generates a selected UE grouping based on the current state-space variables, i.e., the channel metrics and the additional metrics. BS processor 32 provides the selected UE grouping to downlink transmitter 44 of BS 24.

At a downlink transmission operation 78, downlink transmitter 44 schedules and transmits downlink transmissions to UEs 28 in accordance with the selected UE grouping. The UEs receive and decode the downlink transmissions. Depending on whether decoding was successful, the UEs respond with ACKs and/or NACKs over the uplink channel. At a feedback reception operation 82, uplink receiver 48 of BS 24 receives the ACKs and/or NACKs from UEs 28.

At a reward calculation operation 86, policy updating module 60 in CB agent 52 calculates the total rate of successfully-received downlink data, based on the received ACKs and/or NACKs. At a policy updating operation 90, policy updating module 60 updates the policy (the mapping of channel estimates and additional metrics to selected UE grouping), so as to maximize the current rewards. The method then loops back to operation 74 above, in which CB agent 52 applies the updated policy so as to update the UE grouping.

The method flow of FIG. 2 is an example flow that is depicted solely for the sake of conceptual clarity. In alternative embodiments, any other suitable flow can be used.

For example, BS processor 32 typically updates the state-space variables (e.g., the channel estimates and at least some of the UE attributes stored in buffer 68) over time.

Figure 3:
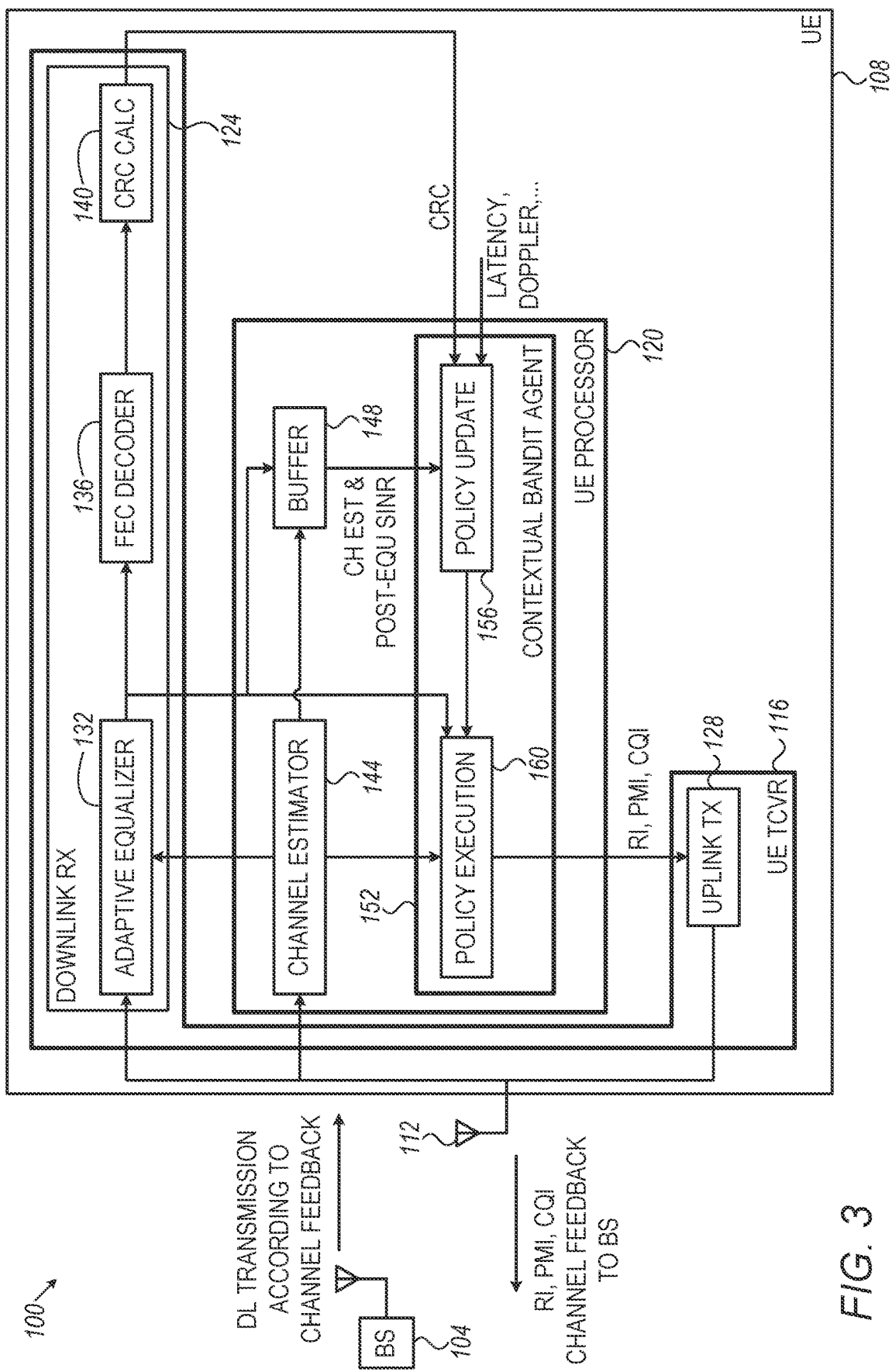
FIG. 3 is a block diagram that schematically illustrates a communication system that estimates channel feedback using a Contextual Bandit (CB), in accordance with an embodiment that is described herein.

FIG. 3 is a block diagram that schematically illustrates a communication system 100 that estimates channel feedback using a Contextual Bandit (CB) process, in accordance with another embodiment that is described herein. System 100 comprises a BS 104 and a UE 108. BS 104 transmits downlink (DL) signals to UE 108 over a wireless communication channel, and receives uplink (UL) signals from UE 108 over the wireless communication channel. Typically, BS 104 comprises multiple antennas and UE 108 comprises at least one antenna, therefore the communication channel is a MIMO channel. For simplicity, FIG. 3 shows only a single UE 108 although real-life systems typically comprise multiple UEs.

In some embodiments, in addition to uplink data, UE 108 also transmits channel feedback information that assists BS 24 in configuring subsequent downlink transmissions. Channel feedback may comprise, for example, a requested transmission rank (maximal number of spatial streams to be transmitted) such as a Rank Indicator (RI), a requested precoding scheme such as a Precoding Matrix Indicator (PMI), and/or a Channel Quality Indicator (CQI) that is indicative of the requested Modulation and Coding Scheme (MCS). Additionally or alternatively, UE 108 may transmit any other suitable channel feedback information.

In an example embodiment, BS 104 and UE 108 operate in accordance with the 3GPP 5G cellular standards. Channel feedback schemes for such networks are specified, for example, in 3GPP Technical Specification TS 36.211, entitled "3rd Generation Partnership Project; Technical Specification Group Radio Access Network; Evolved Universal Terrestrial Radio Access (E-UTRA); Physical channels and modulation (Release 14)," version 14.15.0, June, 2020, Section 6.4. In alternative embodiments, however, system 100 may operate in accordance with any other suitable communication standard or protocol that supports channel feedback, such as, for example, Wi-Fi.

In the present example, UE 108 comprises at least one antenna 112, a UE TCVR 116 and a UE processor 120. UE transceiver 116 comprises an uplink transmitter (TX) 128 configured to transmit uplink signals to BS 104 via antenna 112, and a downlink receiver (RX) 124 configured to receive downlink signals from BS 104 via antenna 112. UE processor 120 is configured to carry out the various processing tasks of the BS.

Downlink receiver 124 comprises an adaptive equalizer 132, a Forward Error Correction (FEC) decoder 136 and a Cyclic Redundancy Check (CRC) calculator 140. On receiving a downlink signal that carries a downlink transmission (e.g., packet) from BS 104, equalizer 132 equalizes the signal so as to compensate for various channel effects, FEC decoder 136 decodes the FEC code with which the transmission is encoded, and CRC calculator 140 calculates a CRC over the decoded transmission and outputs a success/failure indication.

In an embodiment, UE processor 120 comprises a channel estimator 144, which is configured to calculate channel estimates that approximate the response of the downlink MIMO channel based on the received downlink signal. Channel estimator 144 stores the channel estimates (denoted "CH EST" in the figure) in a memory buffer 148. UE processor 120 also calculates, and stores in buffer 148, values of Signal-to-Interference-and-Noise Ratio (SINR) at the output of equalizer 132 (denoted "POST-EQU SINR" in the figure).

In some embodiments, UE processor 120 calculates the channel feedback (e.g., RI, PMI and CQI) using a Contextual Bandit (CB) agent 152 that carries out an iterative CB process. The output of CB agent 152 comprises one or more channel feedback parameters (e.g., RI, PMI and CQI values) that are provided to uplink transmitter 128. Transmitter 128 transmits the channel feedback to BS 104, for use in configuring subsequent downlink transmissions.

As explained previously, the CB process typically uses a "mapping policy" (also referred to herein as "policy"), which maps channel estimates and additional relevant metrics to channel feedback parameters. In CB terminology, the policy maps a state space onto an action space, and iteratively modifies the policy so as to maximize certain rewards. In an embodiment, the state space, action space and rewards may comprise any of the following.

The State-space variables typically comprise baseband channel estimates that approximate the response of the downlink MIMO channel between the antennas of BS 104 and the antenna or antennas 112 of UE 108 (e.g., "CH EST" in FIG. 1—as stored in buffer 148). The channel estimates may pertain to the entire bandwidth of downlink receiver 124, or to a partial bandwidth. In an embodiment, the channel estimates may be of lower dimensionality than the full dimensionality of the MIMO channel. Lower dimensionality channel estimates can be produced, for example, by projection using the channel eigenvectors, or using an autoencoder, for example.

In an embodiment, in addition to the channel estimates, the state-space variables may also comprise additional metrics such as, for example, any or all of the following:

Doppler frequency or other metric that is indicative of the coherence time of the communication channel.

Scheduling latency, defined as the latency between measurement of the channel in UE 108 and reception of the subsequent downlink transmission (e.g., packet) that is transmitted in accordance with the corresponding channel.

Post-equalization SINR (e.g., "POST-EQU SINR" in FIG. 1—as stored in buffer 148).

In an embodiment, the action space comprises tuples of {RI, PMI, CQI} values. The rewards may comprise, for example, a count of successful CRC indications from CRC calculator 124, Exit information from FEC decoder or some quantized version of such exit information, and/or post-equalization SINR. Additionally or alternatively, any other suitable parameters can be used for the state space, action space and rewards.

In an embodiment, CB agent 152 comprises a policy update module 156, which updates the policy based on updated state-space variables, and a policy execution module 160, which executes the updated policy so as to generate updated channel feedback parameters. The CB process can be viewed as having two stages that are repeated iteratively (as detailed in FIG. 4 below):

Policy execution: In this stage, policy execution module 160 applies the current policy, i.e., generates a {RI, PMI, CQI} tuple based on the current state-space variables.

Policy update: In this stage, policy update module 156 calculates the current rewards (e.g., the current rate of CRC successes and/or current post-equalization SINR), and updates the policy based on updated state-space variables so as to maximize the rewards.

In various embodiments, any suitable CB technique, such as the techniques cited above, can be used for implementing CB agent 152 and its components.

Figure 4:
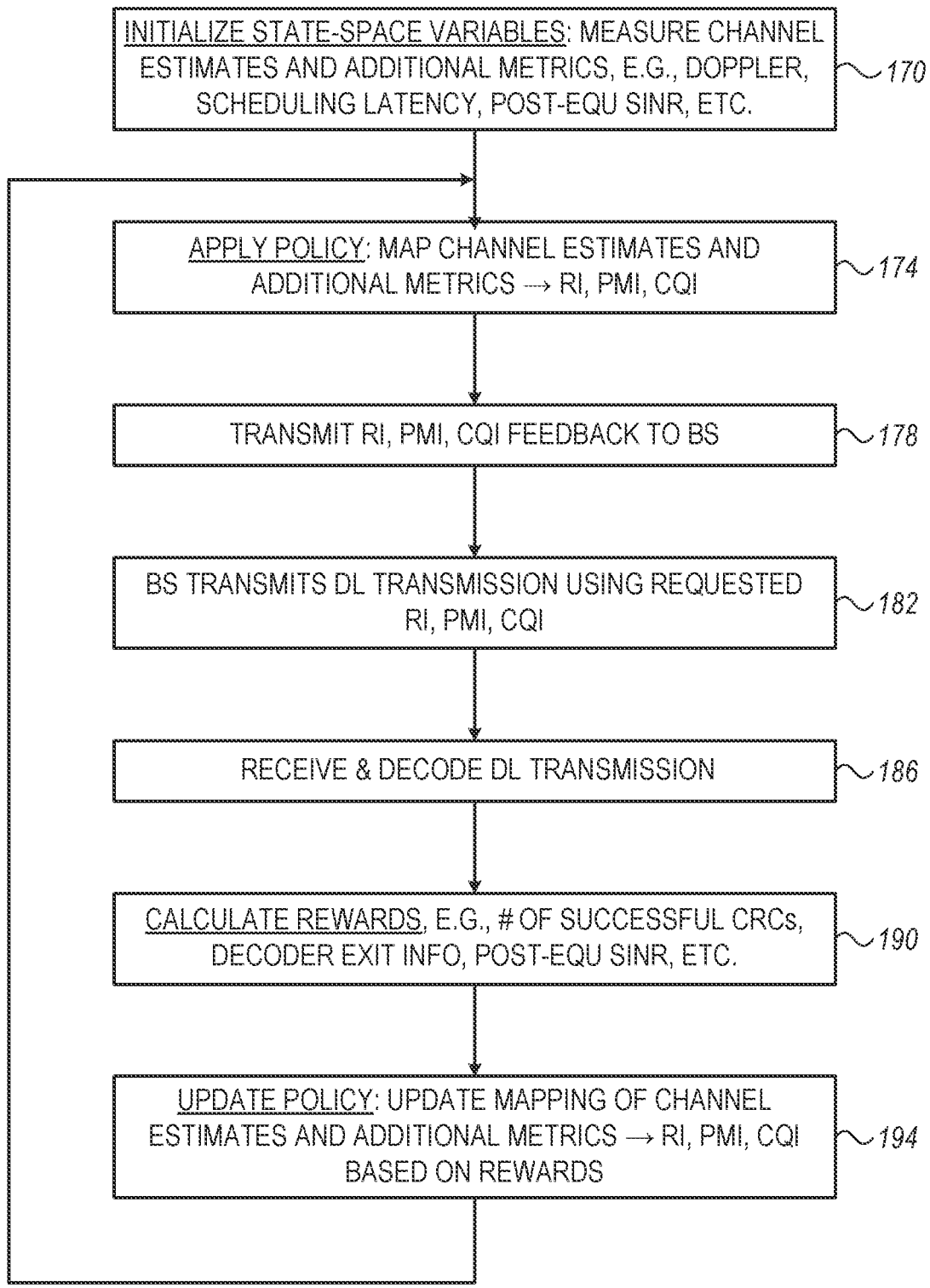
FIG. 4 is a flow chart that schematically illustrates a method for channel feedback estimation in the communication system of FIG. 3, in accordance with an embodiment that is described herein.

FIG. 4 is a flow chart that schematically illustrates a method for channel feedback estimation in communication system 100 of FIG. 3, in accordance with an embodiment that is described herein. The method begins with UE processor 120 of UE 108 initializing the state-space variables, at a state space initialization operation 170. In an embodiment, UE processor 120 calculates initial values of the channel estimates using channel estimator 144 and provides the channel estimates to CB agent 152 via buffer 148. UE processor 120 may also obtain additional metrics described above, e.g., Doppler and latency information, and post-equalization SINR.

At a policy application operation 174, policy execution module 160 in CB agent 152 executes the current policy. In an embodiment, policy execution module 160 generates a tuple of {RI,PMI,CQI} channel feedback parameters based on the current state-space variables, i.e., the channel metrics and the additional metrics. UE processor 120 provides the channel feedback parameters to uplink transmitter 128.

At an uplink transmission operation 178, uplink transmitter 128 transmits the channel feedback parameters to BS 104. At a downlink transmission operation 182, BS 104 transmits subsequent downlink transmissions (e.g., packets) using the transmission scheme requested by the {RI,PMI,CQI} tuple. For example, BS 104 may transmit the downlink transmissions using a rank that does not exceed the reported RI, a precoding scheme that corresponds to the reported PMI, and an MCS that corresponds to the reported CQI.

At a downlink reception & decoding operation 186, receiver 124 of UE 108 receives and decodes the downlink transmissions. At a reward calculation operation 190, policy updating module 156 in CB agent 152 calculates the rewards (e.g., the number of successful CRC indications and/or post-equalization SINR) corresponding to the received downlink transmissions.

At a policy updating operation 194, policy updating module 156 updates the policy (the mapping of channel estimates and additional metrics to the selected {RI,PMI,CQI} tuple), so as to maximize the current rewards. The method then loops back to operation 174 above, in which CB agent 152 applies the updated policy.

The method flow of FIG. 4 is an example flow that is depicted solely for the sake of conceptual clarity. In alternative embodiments, any other suitable flow can be used.

The configuration of communication systems 20 and 100 and their components, such as the internal configurations of BS 32 and UE 108, as shown in FIGS. 1 and 3, are example configurations that are depicted solely for the sake of clarity. In alternative embodiments, any other suitable configurations can be used. Elements that are not mandatory for understanding of the disclosed techniques have been omitted from the figures for the sake of clarity.

The different elements of systems 20 and 100 and their components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of the components of systems 20 and 100, e.g., of BS processor 32 and/or UE processor 120, may be implemented in software and/or using a combination of hardware and software elements.

In some embodiments, at least some of the functions of BS processor 32 and/or UE processor 120, e.g., the functions of CB agent 52 and/or CB agent 152, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
obtaining channel estimates that approximate a response of a communication channel between a transmitter and one or more receivers; and
performing an iterative process for improving one or more predefined quality metrics of communication between the transmitter and the one or more receivers, the iterative process comprising:
mapping at least the channel estimates into a transmission scheme of the transmitter using a mapping policy;
causing the transmitter to apply the transmission scheme;
based on signals transmitted from the transmitter to the one or more receivers using the transmission scheme, obtaining values of the one or more predefined quality metrics; and
modifying the mapping policy to improve the quality metrics.

2. The method according to claim 1, wherein obtaining the quality metrics comprises obtaining an estimate indicative of a successful data throughput between the transmitter and the one or more receivers.

3. The method according to claim 1, wherein the one or more receivers comprise multiple receivers, wherein the communication channel comprises a Multi-User Multiple-Input Multiple-Output (MU-MIMO) channel between the transmitter and the multiple receivers, and wherein mapping at least the channel estimates into the transmission scheme comprises selecting groups of the receivers to be grouped together for MU-MIMO communication.

4. The method according to claim 3, wherein mapping at least the channel estimates into the transmission scheme comprises selecting the groups of the receivers based on both (i) the channel estimates and (ii) respective attributes of one or more of the receivers.

5. The method according to claim 1, wherein mapping at least the channel estimates into the transmission scheme comprises selecting for the transmitter one or more of (i) a transmission rank, (ii) a precoding scheme and (iii) a modulation and coding scheme.

6. The method according to claim 5, wherein mapping at least the channel estimates into the transmission scheme comprises selecting the transmission scheme based on the channel estimates and one or more of:

a metric indicative of a coherence time of the communication channel;

a metric indicative of a scheduling latency between a receiver and the transmitter; and a metric indicative of a signal-to-noise ratio measured at a receiver.

7. The method according to claim 1, wherein modifying the mapping policy comprises running a Contextual Bandit (CB) process that aims to map at least the channel estimates into the transmission scheme by a mapping that maximizes the one or more predefined quality metrics.

8. The method according to claim 1, wherein performing the iterative process comprises improving the predefined quality metrics in a given iteration of the iterative process, based on the signals transmitted from the transmitter to the one or more receivers in a previous iteration of the iterative process.

9. A communication device, comprising:

a transceiver, configured to communicate with one or more peer communication devices over a communication channel; and a processor, configured to obtain channel estimates that approximate a response of the communication channel, and to perform an iterative process for improving one or more predefined quality metrics of communication between the communication device and the one or more peer communication devices, the iterative process comprising:

mapping, using a mapping policy, at least the channel estimates into a transmission scheme of a transmitter of the communication device or of a peer communication device;

causing the transmitter to apply the transmission scheme;

based on signals transmitted from the transmitter to the one or more peer communication devices using the transmission scheme, obtaining values of the one or more predefined quality metrics; and modifying the mapping policy to improve the quality metrics.

10. The communication device according to claim 9, wherein the processor is configured to obtain the quality metrics by obtaining an estimate indicative of a successful data throughput between the transmitter and the one or more receivers.

11. The communication device according to claim 9, wherein the one or more receivers comprise multiple receivers, wherein the communication channel comprises a Multi-User Multiple-Input Multiple-Output (MU-MIMO) channel between the transmitter and the multiple receivers, and wherein the processor is configured to map at least the channel estimates into the transmission scheme by selecting groups of the receivers to be grouped together for MU-MIMO communication.

12. The communication device according to claim 11, wherein the processor is configured to select the groups of the receivers based on both (i) the channel estimates and (ii) respective attributes of one or more of the receivers.

13. The communication device according to claim 9, wherein the processor is configured to map at least the channel estimates into the transmission scheme by selecting for the transmitter one or more of (i) a transmission rank, (ii) a precoding scheme and (iii) a modulation and coding scheme.

14. The communication device according to claim 13, wherein the processor is configured to select the transmission scheme based on the channel estimates and one or more of:

a metric indicative of a coherence time of the communication channel;

a metric indicative of a scheduling latency between a receiver and the transmitter; and a metric indicative of a signal-to-noise ratio measured at a receiver.

15. The communication device according to claim 9, wherein the processor is configured to modify the mapping policy by running a Contextual Bandit (CB) process that aims to map at least the channel estimates into the transmission scheme by a mapping that maximizes the one or more predefined quality metrics.

16. The communication device according to claim 9, wherein the processor is configured to improve the predefined quality metrics in a given iteration of the iterative process, based on the signals transmitted from the transmitter to the one or more receivers in a previous iteration of the iterative process.

* * * * *